US 6,625,700 B2

(12) United States Patent
Ma et al.

(10) Patent No.: US 6,625,700 B2
(45) Date of Patent: Sep. 23, 2003

(54) ARBITRATION AND SELECT LOGIC FOR ACCESSING A SHARED MEMORY

(75) Inventors: James H. Ma, San Jose, CA (US); Lisa C. Grenier, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 131 days.

(21) Appl. No.: 09/870,818

(22) Filed: May 31, 2001

(65) Prior Publication Data

US 2002/0188811 A1 Dec. 12, 2002

(51) Int. Cl.$^7$ ............................................. G06F 13/00
(52) U.S. Cl. ..................... 711/151; 711/158; 711/163
(58) Field of Search ................................. 711/151, 158, 711/163

(56) References Cited

U.S. PATENT DOCUMENTS

| | | | |
|---|---|---|---|
| 5,938,749 A | * 8/1999 | Rusu et al. ................... 710/54 |
| 5,983,301 A | * 11/1999 | Baker et al. ................. 710/113 |
| 6,141,323 A | * 10/2000 | Rusu et al. .................. 370/236 |
| 6,173,378 B1 | 1/2001 | Rozario et al. .............. 711/163 |
| 6,199,145 B1 | * 3/2001 | Ajanovic et al. ........... 711/149 |
| 6,202,137 B1 | * 3/2001 | Ottinger ...................... 711/168 |
| 6,370,624 B1 | * 4/2002 | Ajanovic et al. ........... 711/149 |
| 6,389,480 B1 | 5/2002 | Kotzur et al. ................ 709/249 |
| 6,490,665 B1 | * 12/2002 | Lai et al. .................... 711/160 |

* cited by examiner

*Primary Examiner*—Reba I. Elmore
(74) *Attorney, Agent, or Firm*—Meyertons Hood Kivlin Kowert & Goetzel, P.C.; B. Noël Kivlin

(57) ABSTRACT

A technique for arbitrating and selecting one access request to a shared memory from among multiple contenders is disclosed. In a first aspect, the invention includes a method for accessing a shared memory. The method includes receiving a plurality of access requests; presenting a plurality of characteristics for each access request; ascertaining a plurality of operational characteristics; and selecting one of the access requests for processing upon consideration of the access request characteristics and the operational characteristics. In a second aspect, the invention includes an arbitration and select logic ("ASL") unit. The ASL unit comprises a plurality of input sorting units, each input sorting unit capable of receiving a respective access request and a merge and interleave unit ("MIU"). The MIU is capable of receiving a plurality of characteristics for each access request; receiving a plurality of operational characteristics; and selecting one of the access requests for processing upon consideration of the access request characteristics and the operational characteristics.

50 Claims, 7 Drawing Sheets

ARBITRATION AND SELECT LOGIC FOR ACCESSING A SHARED MEMORY

BACKGROUND OF THE INVENTION

1. Field of the Invention

The present invention pertains to managing of shared resources in a computing environment, and, more particularly, to techniques for arbitrating and selecting one access request to a shared memory from among multiple contenders.

2. Description of the Related Art

The evolution of electronic computing systems included the development of more sophisticated techniques for utilizing their computing resources. Consider, for example, a shared memory. A shared memory may be read from and written to by more than one device, e.g., several processors. The devices perform their assigned functions, reading from and writing to the shared memory. The devices request access to the shared memory through a memory controller that controls the operation of the shared memory. Typically, several devices are trying to access the shared memory in this fashion at any given time. However, for a variety of reasons, the devices generally are permitted to access the shared memory only one at a time. The memory controller, or some electronic circuitry associated with the memory controller, must select one of the access requests to process at any given time.

Several techniques are conventionally employed by electronic computing systems for deciding the order in which simultaneously pending access requests are processed. One conventional technique is a "round robin" method, wherein access requests are handled in some round robin order depending on the hardware involved. Another conventional technique processes access requests in order of an assigned priority. Still other conventional techniques process access requests in random order, or on a first-come, first-served basis.

Each of these conventional techniques is built around and implements a rigid set of ordering rules that are predefined and then rigorously implemented. The wooden, mechanical application of the ordering rules inherent in these conventional techniques frequently adversely impacts performance. More particularly, the order in which access requests are processed can significantly impact the bandwidth of the information processed responsive to the access requests.

For instance, the internal design of dynamic random access memory ("DRAM") devices from which shared memories are typically constructed favor accesses to data in the same "page." A page is a block of data that the internal DRAM control logic operates on for each access. Internal DRAM data is organized as pages, so that successive accesses to data bits that are in the same page are faster than successive accesses to data bits which are not in the same page. Because of this characteristic of DRAMs, it is more optimal to select memory requests that access data bits in the same DRAM page. Higher memory bandwidth can be achieved if successive memory requests are all accessing the same page of data. Thus, increased performance can be realized by ordering accesses to maximize the number of successive accesses to the same page(s).

Similarly, the total request throughput rate may be impacted by the selection order. It is common for requesting ports to have first-in, first-out ("FIFO") queues that buffer memory requests and FIFOs that buffer the memory data returned by read memory requests. As long as these FIFOs are not filled, additional request may be generated and new memory read data returned. If a request FIFO is filled, then the corresponding port must stop and wait until the FIFO has room again. Thus, the request throughput rate will be lower. Likewise, if the memory read data FIFO is filled, then the memory controller must stop and wait until there is room in the FIFO. Again, the request throughput rate suffers. Because of the finite capacity of FIFOs used to store requests and memory read data, it is more efficient to select requests such that the FIFOs will not be filled. By avoiding the full condition, requests may be continually processed with no interruption. Thus, a higher request throughput rate is achieved.

To maximize efficiency and throughput rate under these types of constraints, arbitration and select logic used to decide the selection order should dynamically consider these types of factors. During each operational cycle, the requests should be examined for impact on performance and the more favorable request selected. It is also desirable to adjust the importance of priority of each of these constraints. This allows the various constraints to be weighed differently in making the selection.

However, conventional arbitration and select techniques consider none of these factors in a dynamic fashion. If they are considered at all, they are considered only in a mechanical fashion. Predetermined rules are woodenly applied. If a technique considers, for instance, two successive requests access the same page, whether a third request resides in a full FIFO is considered in the same fashion every time. Thus, although the shared memory might appreciate higher utilization, its performance is typically less than what it could be.

SUMMARY OF THE INVENTION

The invention comprises a technique for arbitrating and selecting one access request to a shared memory from among multiple contenders. In a first aspect, the invention includes a method for accessing a shared memory. The method includes receiving a plurality of access requests; presenting a plurality of characteristics for each access request; ascertaining a plurality of operational characteristics; and selecting one of the access requests for processing upon consideration of the access request characteristics and the operational characteristics. In a second aspect, the invention includes an arbitration and select logic ("ASL") unit. The ASL unit comprises a plurality of input sorting units, each input sorting unit capable of receiving a respective access request and a merge and interleave unit ("MIU"). The MIU is capable of receiving a plurality of characteristics for each access request; receiving a plurality of operational characteristics; and selecting one of the access requests for processing upon consideration of the access request characteristics and the operational characteristics.

BRIEF DESCRIPTION OF THE DRAWINGS

The invention may be understood by reference to the following description taken in conjunction with the accompanying drawings, in which like reference numerals identify like elements, and in which.

Figure 1:
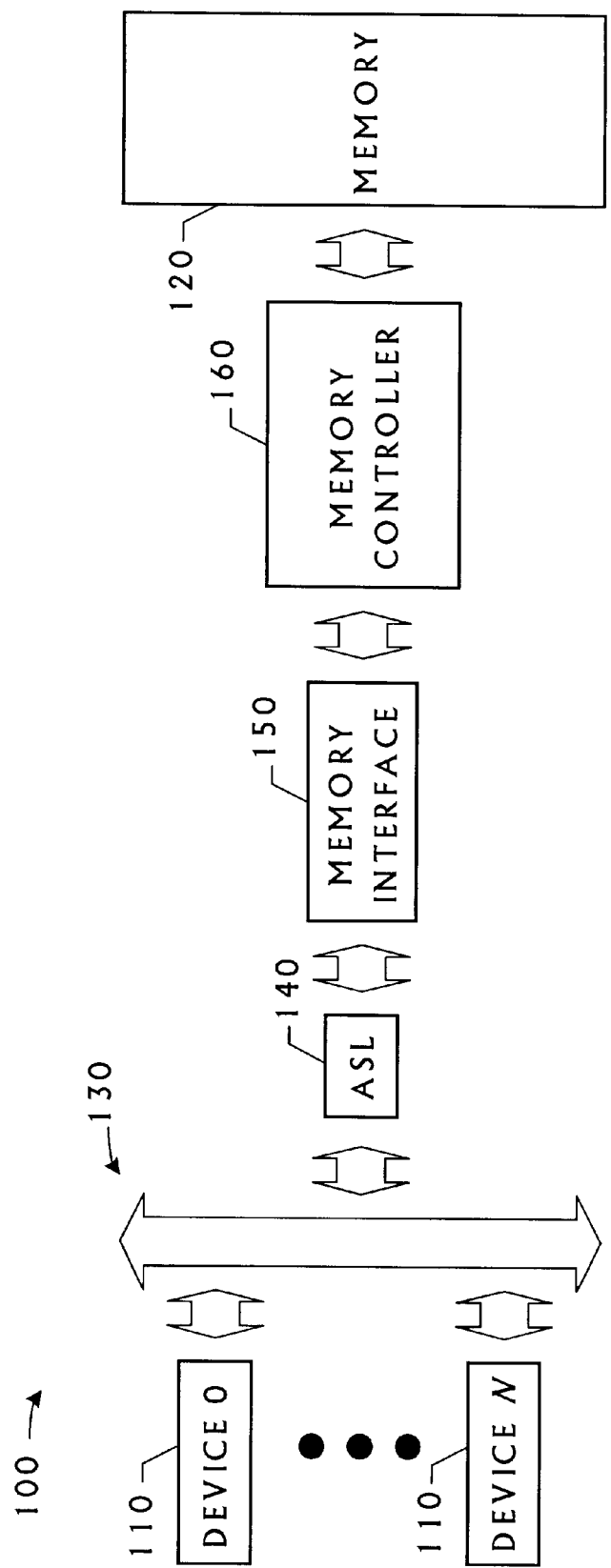
FIG. 1 depicts, in conceptual block diagram, a memory subsystem of a computing device, not otherwise shown, constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates in a block diagram a memory subsystem 100 of a computing device, not otherwise shown, constructed and operated in accordance with the present invention. The computing device in the illustrated embodiment is a Sun UltraSPARC™ workstation (e.g., from the Sun Blade™ or the Ultra™ line of workstations) employing a UNIX-based operating system (e.g., a Solaris™ OS) commercially available from the assignee of this application, Sun Microsystems, Inc. However, the invention is not so limited. The computing device may be implemented in virtually any type of electronic computing device such as a laptop computer, a desktop computer, a mini-computer, a mainframe computer, or a supercomputer. The workstation is built around an UltraSPARC™ 64-bit processor available from Sun Microsystems, but, again, the invention is not so limited. The microSPARC™ from Sun Microsystems, any of the Itanium™ or Pentium™-class processor from Intel Corporation, the Athlon™ or Duron™class processors from Advanced Micro Devices, Inc., or the Alpha™ processor from Compaq Computer Corporation might also be employed in alternative embodiments.

The memory subsystem 100 includes a plurality of devices 110 generating access requests for a shared memory 120. The access requests are communicated from the devices 110 over a bus system 130. The memory subsystem 100 includes an arbitration and select logic ("ASL") unit 140 that arbitrates among the competing access requests and selects one for implementation with the shared memory 120. The ASL unit 140 outputs the selected access request to a memory interface 150, which then processes it through to a memory controller 160, which implements the access request to or from the memory 120. The devices 110, shared memory 120, bus system 130, memory interface 150, and memory controller 160 may be implemented using any conventional technique known to the art so long as the memory 120 is implemented as a shared memory.

Figure 2:
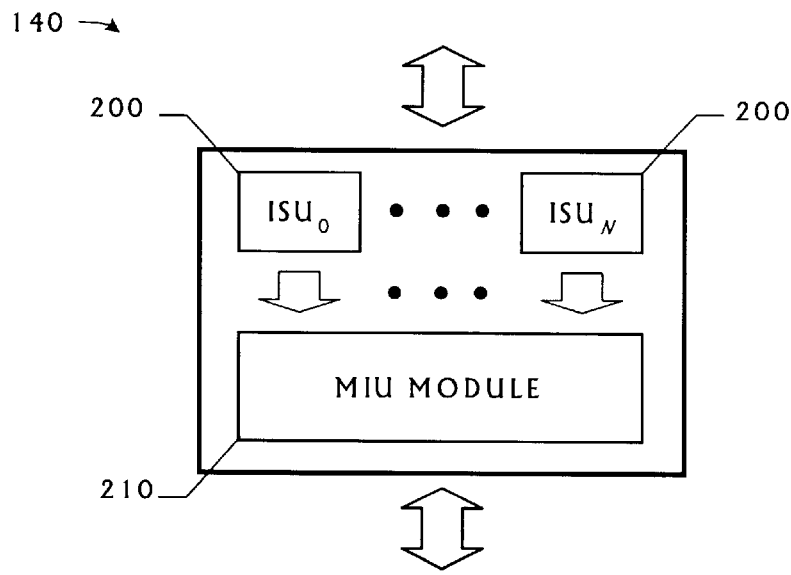
FIG. 2 depicts, again in a conceptual block diagram, the arbitration and selection logic of the memory subsystem of FIG. 1.

FIG. 2 conceptually illustrates in a block diagram the ASL unit 140 of the memory subsystem 100 of FIG. 1. The ASL unit 140 generally comprises a plurality of input sorting units ("ISU") 200, one for each of the devices 110. The ISUs 200 may be implemented using any suitable technique known to the art, e.g., a first-in, first-out ("FIFO") queue accompanied by circuitry for address determination and manipulation. The ASL unit 140 also includes a merge and interleave unit ("MIU") 210. Each ISU 200 receives requests over the bus system 130 from its respective device 110. The ISUs 200 forward the received requests to the MIU 210 as they are received. In each operational cycle, the MIU 210 looks at each of the presented requests and selects one for further processing.

The MIU 210 dynamically considers a number of factors in each selection, such as:

factors maximizing the bandwidth efficiency of the shared memory 120, i.e., the operational characteristics of the requests themselves;

factors minimizing stalls on requests processed through the ISUs 200, i.e., the operational characteristics of the ASL unit 140 itself; and fairness, meaning that, all other things being equal, no ISU 200 is favored over another.

As will be appreciated by those skilled in the art having the benefit of this disclosure, the exact identity of the factors considered and the weight given them will be implementation specific. The invention therefore admits wide variation in the manner in which these and other factors can be weighed and considered.

Figure 3:
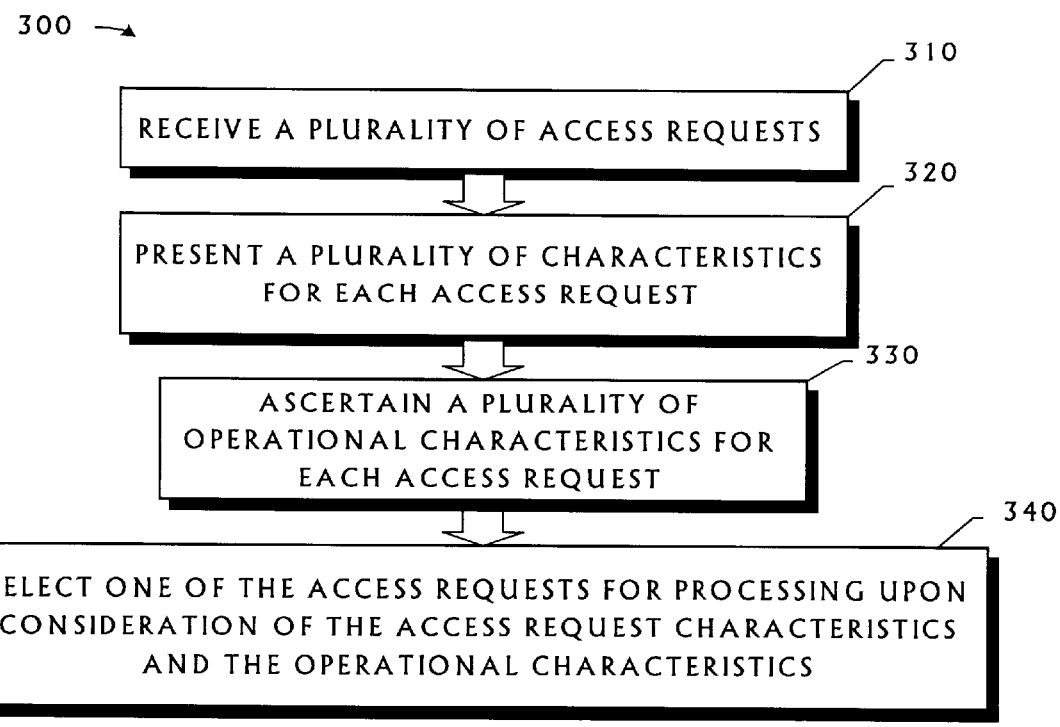
FIG. 3 illustrates one particular embodiment of a method for arbitrating and selecting one access request to a shared memory from among multiple contenders in accordance with the present invention.

FIG. 3 illustrates one particular method 300 implemented by the ASL unit 140 as shown in FIG. 2 in accordance with the present invention. As set forth in box 310, the method 300 begins when the ISUs 200 receive access requests. As each ISU 200 receives an access request, it presents certain characteristics of the access request to the MIU 210, as set forth in the box 320. The factors influencing the selection of these requests is discussed further below. Next, the MIU 210 ascertains selected operational characteristics associated with the request, e.g., whether the ISU 200 in which it resides is full, as is set forth in box 330. Finally, as set forth in box 340, the MIU 210 selects one of the access requests for processing upon consideration of the access request characteristics and the operational characteristics. Note that, because the operational characteristics are ascertained at the time the access request is presented, and because the access request characteristics are presented as the access requests are received, the MIU 210 is considering these factors dynamically.

Turning now to FIGS. 4–8, one particular embodiment 400 of the present invention is presented to further an understanding of the present invention. The embodiment 400 is the memory subsystem of a graphics processing system not otherwise shown. To this end, the implementation includes four frame buffer controllers ("FBC") 410, i.e., $FBC_0$–$FBC_3$, each with a rendering pipeline 415. The frame buffer controllers $FBC_0$–$FBC_3$ generate access requests that are communicated over a bus system 420 to an ASL unit 425. The ASL unit 425 selects one of the presented requests and processes it to a memory interface 430. In the illustrated implementation, the memory interface 430 is a 200M Triangle Graphics memory interface commercially available from Sun Microsystems, the assignee of the present invention. The memory interface 430 then forwards the selected request to a memory controller 432, which implements the access request to or from a memory 440. The memory 440 is a video memory, such as a video random access memory ("VRAM"), comprised of multiple DRAM devices 445 arranged in banks in a conventional interleaved memory technique. More particularly, the memory 440 in this particular embodiment is a frame buffer pixel memory. If the access request is a read, the data is communicated back to the frame buffer controllers $FBC_0$–$FBC_3$ that generated the request via a respective dedicated read buffers ("RBs") 435, i.e., Read Data $FIFO_0$-Read Data $FIFO_3$.

Figure 4:
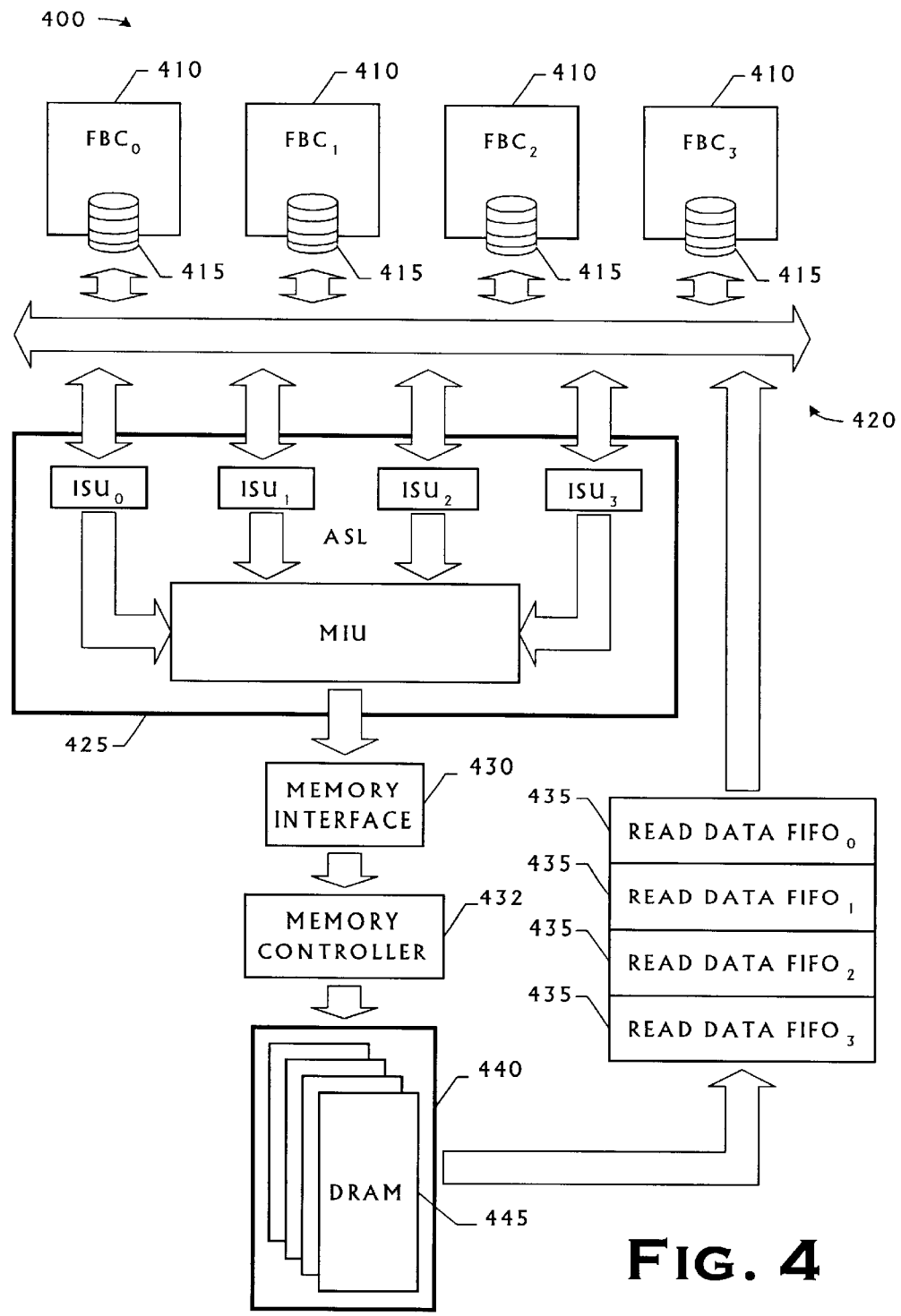
FIG. 4 depicts, in another conceptual block diagram, one particular embodiment of the memory subsystem of FIG. 1.
Figure 5:
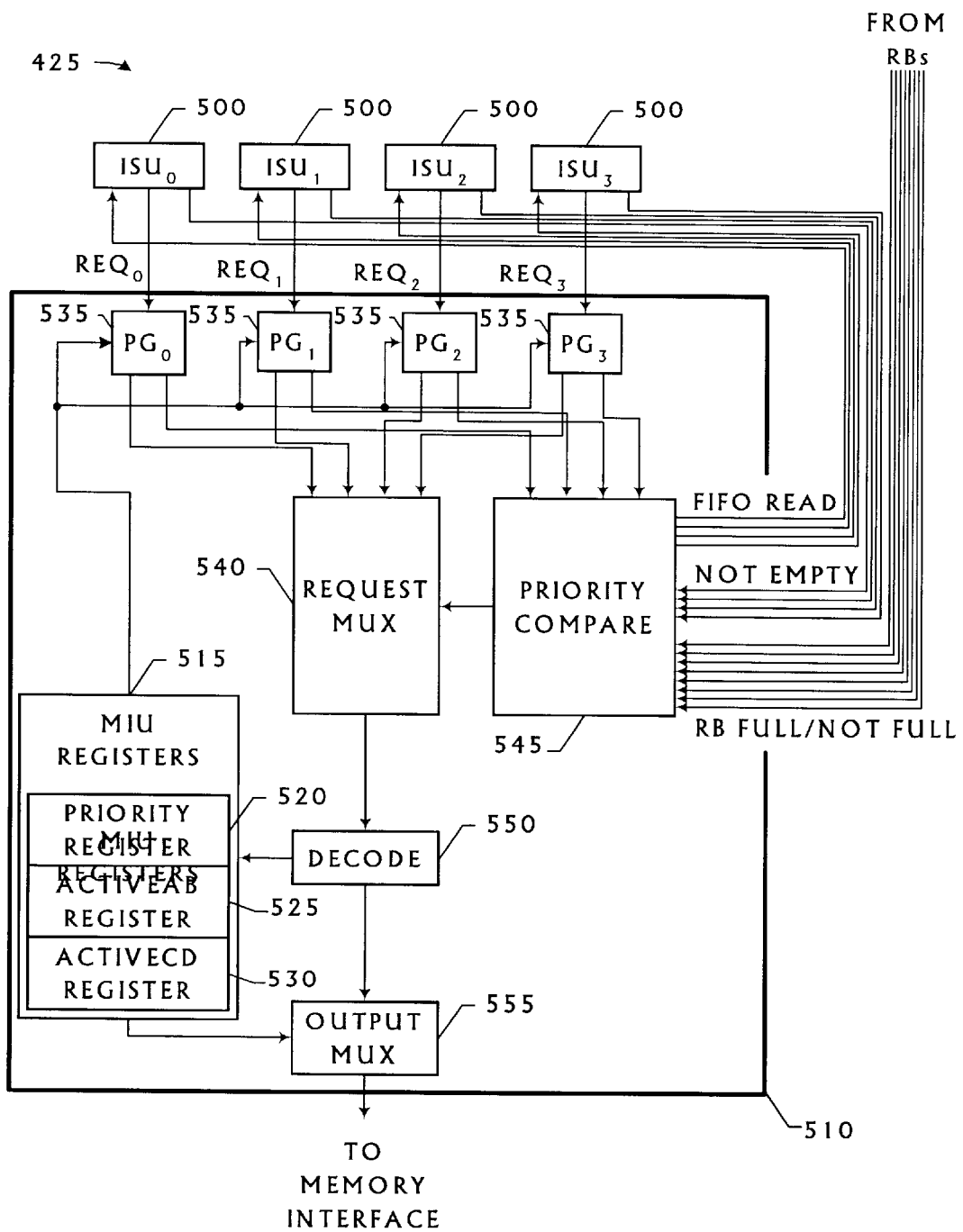
FIG. 5 depicts, in a conceptual block diagram, the arbitration and select logic of the embodiment in FIG. 4.

FIG. 5 illustrates the ASL unit 425 of FIG. 4 in greater detail. The ASL unit 425 includes an ISU 500, i.e., $ISU_0$–$ISU_3$, for each FCB $FCB_0$–$FCB_3$ (shown in FIG. 4). The $ISU_0$–$ISU_3$ are implemented as FIFO queues in this particular implementation. Note, however, that alternative implementations and alternative embodiments might employ other types of data structures. The $ISU_0$–$ISU_3$ forward the access request to a respective priority generator ("PG") circuits 535, i.e., $PG_0$–$PG_3$, in the MIU 510. The priority generator circuits 535 $PG_0$–$PG_3$ which determine a partial priority for their respective access request. In some embodiments, the priority generator circuits 535 may completely determine the entire composite request priority. However, in the illustrated embodiment, the final composite request priority is determined in the priority compare circuit 545.

Although the factors contributing to good performance can be readily identified, it is not always easy to tell which are the most important in a given application. Thus, the ASL unit 425 in this particular implementation includes some programmable MIU registers 515. The identification, address, and functionality of each of the registers 515 is set forth in Table 1 below. The selection by the MIU 510 is based on the characteristics of the requests and various operational characteristics, e.g., the status of the $ISU_0$–$ISU_3$, configuration registers (not shown), and programmed priority control determined by the content of the MIU Registers 515.

TABLE 1

MIU Programmed Priority Registers

| Register Name | Register Address | Bits | Field | Functionality |
|---|---|---|---|---|
| Priority Register | 8h'80 | [15:12] | FIFO Highwater Mark Priority | Priority weight of FIFO Highwater Mark; set to 4'h3 by reset |
|  | 8h'80 | [11:8] | Page Hit Priority | Priority weight of Page Hit; set to 4'hF by reset |
|  | 8h'80 | [7:4] | Bank Miss Priority | Priority weight of Bank Miss; set to 4'h3 by reset |
|  | 8h'80 | [3:0] | Pending Read Priority | Priority weight of Pending Read; set to 4'h0 by reset |
| ActiveAB Register | 8h'81 | [19:18] | Current Active Bank | Contains the current active 3DRAM bank; used for scheduling purposes |

TABLE 1-continued

MIU Programmed Priority Registers

| Register Name | Register Address | Bits | Field | Functionality |
|---|---|---|---|---|
|  | 8h'81 | [17:9] | Bank A Current 3DRAM Page | Contains the Bank A current active 3DRAM page number; used for scheduling purposes |
|  | 8h'81 | [8:0] | Bank B Current 3DRAM Page | Contains the Bank B current active 3DRAM page number; used for scheduling purposes |
| ActiveCD Register | 8h'82 | [17:9] | Bank C Current 3DRAM Page | Contains the Bank C current active 3DRAM page number; used for scheduling purposes |
|  | 8h'82 | [9:0] | Bank D Current 3DRAM Page | Contains the Bank D current active 3DRAM page number; used for scheduling purposes |

Referring now to FIG. 5 and Table 1, the MIU registers 515 include, in this particular implementation, at least three registers with multiple fields in each register. A Priority Register 520 has four fields of four bits each. Each four-bit field is set to a value that is the weight of that condition. For example, if a signal ISO_MI_HW_MARK received from the ISU 500 $ISU_0$ is set to a 1, indicating that $ISU_0$ FIFO is almost full, then the weight of or priority of this condition is the value in bit 15 to bit 12 of the Priority Register 520. An ActiveAB register 525 has three fields of varying size. The bits [19:18] indicate the current DRAM bank. An ActiveCD Register 530 is structured similarly. Note that, in the present implementation, the terms "high water" and "low water" denote the fullness of the respective ISU, i.e., "high water" meaning full and "low water" meaning empty.

The ActiveAB and ActiveCD registers 525, 530 are updated after every request selection. So if a request is selected which chose bank 2 (=bank C) and page =1BF (in hex) then the bits [17:9] of the ActiveCD register 530 would be set to 1BF and the bits [19:18] of the ActiveAB register 525 are set to 2. These updates occur immediately. The reason for changing banks in this particular embodiment when there is a page miss is that the DRAMS 445 used in this particular embodiment are slower when changing pages after having been previously accessed. The active bank identifier indicates the most recently accessed bank.

Each of the four ISUs 500 present a command and date packet (not shown) to the MIU 510. Each ISU 500 provides various FIFO status bits, not empty, read indicator, and high water mark information to the MIU 510 for FIFO reads and priority determination. Table 2 sets forth the content of the requests from the ISUs 500 to the MIU 510.

TABLE 2

Request Signal Content

| Signal Name | Bits | Meaning |
|---|---|---|
| IS0_MI_DATA[65:0] | 66 | Write Data bus from $ISU_0$ |
| IS0_MI_ADDR[24:0] | 25 | Address bus from $ISU_0$ |
| IS0_MI_OPCODE[3:0] | 4 | Opcode from $ISU_0$ |
| IS0_MI_BUFSEL[1:0] | 2 | Buffer select from $ISU_0$ |
| IS0_MI_HW_MARK | 1 | Indicates $ISU_0$ FIFO condition of almost full, high water mark has been reached |
| IS0_MI_NOTEMPTY | 1 | Indicates $ISU_0$ FIFO condition of not empty |

TABLE 2-continued

Request Signal Content

| Signal Name | Bits | Meaning |
|---|---|---|
| IS0_MI_READIND | 1 | Indicates $ISU_0$ FIFO condition of read operations waiting |
| IS1_MI_DATA[65:0] | 66 | Write Data bus from $ISU_1$ |
| IS1_MI_ADDR[24:0] | 25 | Address bus from $ISU_1$ |
| IS1_MI_OPCODE[3:0] | 4 | Opcode from $ISU_1$ |
| IS1_MI BUFSEL[1:0] | 2 | Buffer select from $ISU_1$ |
| IS1_MI_HW_MARK | 1 | Indicates $ISU_1$ FIFO condition of almost full, high water mark has been reached |
| IS1_MI_NOTEMPTY | 1 | Indicates $ISU_1$ FIFO condition of not empty |
| IS1_MI_READIND | 1 | Indicates $ISU_1$ FIFO condition of read operations waiting |
| IS2_MI_DATA[65:0] | 66 | Write Data bus from $ISU_2$ |
| IS2_MI_ADDR[24:0] | 25 | Address bus from $ISU_2$ |
| IS2_MI_OPCODE[3:0] | 4 | Opcode from $ISU_2$ |
| IS2_MI_BUFSEL[1:0] | 2 | Buffer select from $ISU_2$ |
| IS2_MI_HW_MARK | 1 | Indicates $ISU_2$ FIFO condition of almost full, high water mark has been reached |
| IS2_MI_NOTEMPTY | 1 | Indicates $ISU_2$ FIFO condition of not empty |
| IS2_MI_READIND | 1 | Indicates $ISU_2$ FIFO condition of read operations waiting |
| IS3_MI_DATA[65:0] | 66 | Write Data bus from $ISU_3$ |
| IS3_MI_ADDR[24:0] | 25 | Address bus from $ISU_3$ |
| IS3_MI_OPCODE[3:0] | 4 | Opcode from $ISU_3$ |
| IS3_MI_BUFSEL[1:0] | 2 | Buffer select from $ISU_3$ |
| IS3_MI_HW_MARK | 1 | Indicates $ISU_0$ FIFO condition of almost full, high water mark has been reached |
| IS3_MI_NOTEMPTY | 1 | Indicates $ISU_0$ FIFO condition of not empty |
| IS3_MI_READIND | 1 | Indicates $ISU_0$ FIFO condition of read operations waiting |

Note that, in this particular implementation, the MIU 510 should give a higher priority to an ISU 500, indicating it has read operations pending. This is because the FBCs 410 used in this particular implementation cannot perform any writes until the last read is completed. Thus, the MIU 510 should dispatch read operations as quickly as possible to avoid holding up the FBC 410 that has issued the read. The ISU 500 uses one of its condition code bits to indicate it has read operations in its FIFO. However, this is not necessary to the invention. Recall that earlier it was stated that determining priority will to some degree be implementation specific, and this is one example of such.

The MIU 510 also receives four RB high water mark signals and four RB low water mark signals from the associated RBs 435. Each RB 435 buffers read memory data returned from the memory interface 430. The four high water mark signals indicate that the respective RBs 435 are almost full and that the MIU 510 should stop selecting requests from the ISU 500. The four low water mark signals indicate that the respective RBs 435 are almost empty and the MIU 510 may start selecting requests from that ISU 500 again. Table 3 shows the four RB read data FIFO almost full signals RB_MI_HW_Mark[3:0] and the four RB read data FIFO almost empty signals RB_MI_LW_Mark[3:0].

TABLE 3

Inputs from Read Buffers

| Signal Name | Bits | Meaning |
|---|---|---|
| RB_MI_HW_MARK[3:0] | 4 | RB data queue[3:0] is almost full. Stop selecting from corresponding ISU. Each bit corresponds to one RB queue. |
| RB_MI_LW_MARK[3:0] | 4 | RB data queue[3:0] is almost empty. Can select from the corresponding ISU again. Each bit corresponds to one RB queue. |

The MIU 510 in this implementation is designed to:
dispatch one request each cycle from either the same ISU 500 or a different ISU 500;
consider up to six factors for each request in the selection process; and
allow programmable priority control of each of these factors.

In addition to the MIU registers 515 discussed earlier, the MIU 510 also includes a priority generator ("PG") circuit 535 for each ISU 500 (i.e., $PG_0$–$PG_3$), a request multiplexer ("MUX") 540, a priority compare module 545, a decode unit 550, and an output multiplexer ("MUX") 555. In the MIU 510:

the priority generator circuits 535 determine the composite priority of its respective request;

the compare priority module 545 compares the composite priority from all four priority generator circuits 535 and controls the request MUX 540 to select the request that is to be processed;

the decode unit 550 examines the selected request to determine if it is a MIU register 515 operation and, if so, sends the needed control signals and data to the MIU registers 515; and the output MUX 555 combines possible MIU register read data with other request data to be sent to the memory interface 430 (shown in FIG. 4).

In this implementation, each of the priority generator circuits 535, the compare priority module 545, the request MUX 540, the decode unit 550, the MIU registers 515, and the output MUX 555 are implemented using digital logic circuits. Similarly, the ISUs 500 and the RBs 435 are also implemented as digital logical circuits.

Figure 6:
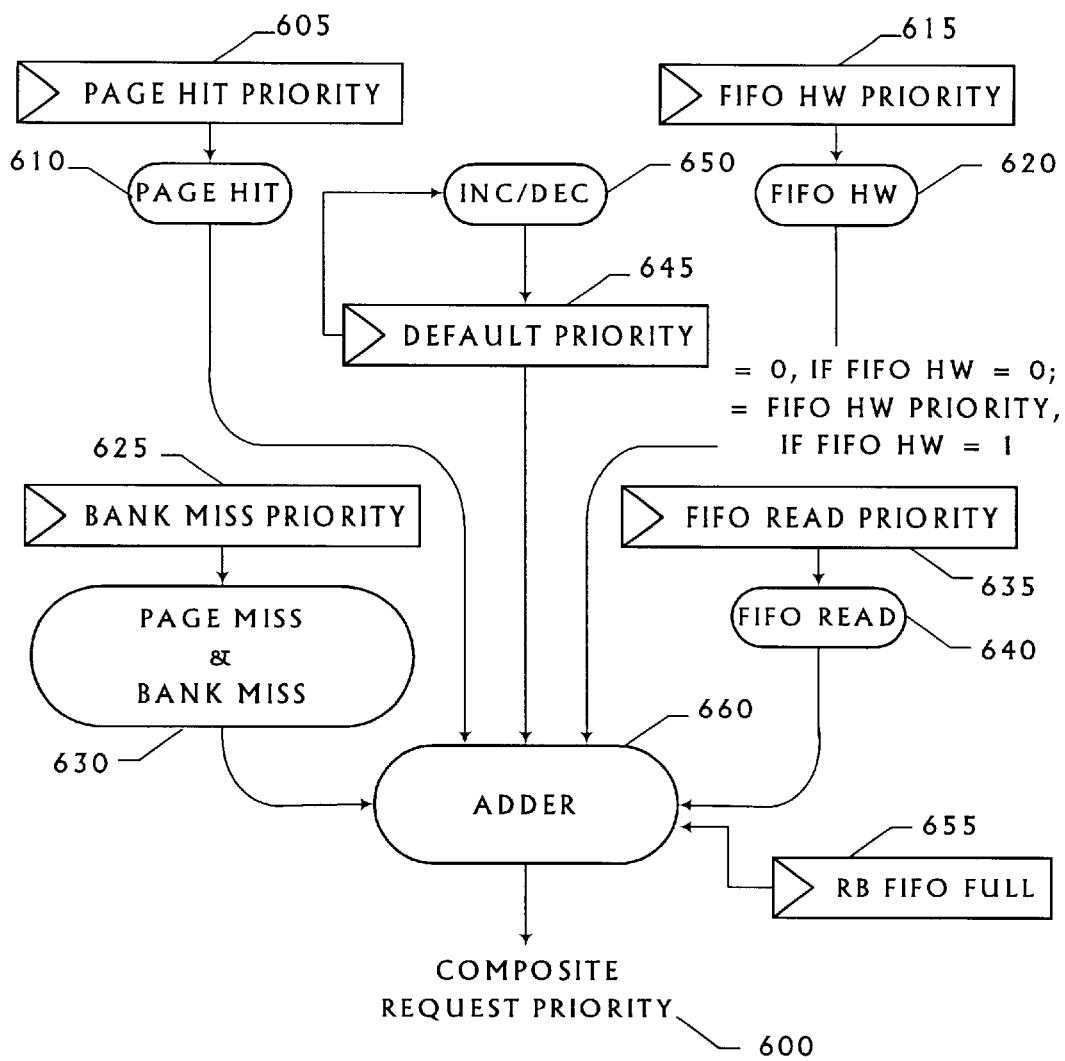
FIGS. 6–8 illustrate the process by which the arbitration and selection logic, in the particular embodiment of FIGS. 4–5, arbitrates and selects one access request to a shared memory from among multiple contenders in accordance with the present invention.

FIG. 6 illustrates how the priority of each composite request priority 600 is determined by the PG circuits 535 and the priority compare circuit 545. The six factors considered in this implementation are:

Page Hit Priority 605—it is desirable to stay within the same page, so requests going to the same page get a higher priority. By looking at the address bits from the ISU 500, the requested bank and the page address can be determined. Then, the requested page address is compared to the current active page address of the requested bank. If the two match, then there is a page hit 610.

FIFO HW Priority 615—if a FIFO is near full, then it needs higher priority of access. The ISU 500 signal indicates if its FIFO is almost fall.

Bank Miss Priority 625—if there is a page miss, then it would be desirable to change banks, so requests going to a different bank get a higher page miss and bank miss priority 630. If there is no page hit, then the requested bank is compared to the current active bank identified in the ActiveAB Register 525 (shown in FIG. 5).

FIFO Read Priority 635—if reads are pending, then that FIFO needs a higher FIFO Read priority 640.

Default Priority 645—a default priority is assigned when a request is first presented in the event none of the other factors applies. If the request is carried over from a previous cycle, the default priority may also be carried over from a previously determined composite request priority. If the request from an ISU 500 is not selected, then its priority should be incremented 650 so that it will be more likely to be selected in the next cycle. If the request of an ISU 500 is selected, then the default priority should be decremented 650 so that requests from other ISUs 500 may be selected.

RB FIFO Full 655—acts as a disable, setting any priority to 0 if the RB FIFO 435 is full, regardless of any other input to the adder 660. If the respective RB FIFO 435 (shown in FIG. 4) for the ISU 500 is full, then that ISU 500 should not be selected until the RB FIFO 435 can be cleared out. Once the ISU 500 is excluded from the selection process, only a corresponding RB low water mark signal will release the exclusion.

The adder 660 then sums the various factors. Note that the above is for pixel operation requests only. For operations unrelated to pixel operations, e.g., write/read registers, the priority is determined by FIFO HW+FIFO Read Indicator+ Default Priority.

More particularly, each of the factors 605, 615, 625, 635, 645, 655 has a programmable priority associated therewith and stored in a field of one of the MIU registers 515 as was discussed above. The programmable priority is a weight that is attributed to that factor. If that factor is true for a given request, then the priority of the request is increased by the weight assigned to that factor. For each request, all of the associated weights are summed by the adder 660 to form the composite priority of that request. There is also the default priority 645 for each request. The default priority is initialized to zero during reset as well as anytime the NotEmpty flag is deasserted. Thereafter, this default priority 645 is incremented every fourth time the ISU 500's request is not selected. The default priority 645 is decremented by two each time the request is selected, unless the priority is 1 or 0. In that case, the priority is not changed.

Figure 7:
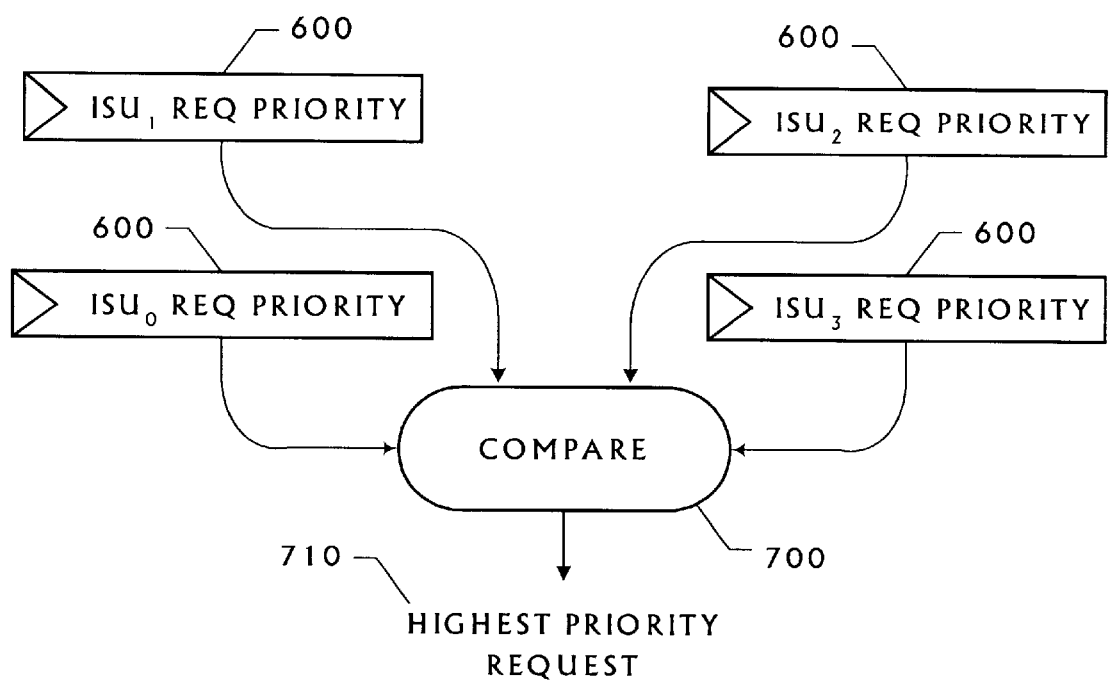
Figure 8:
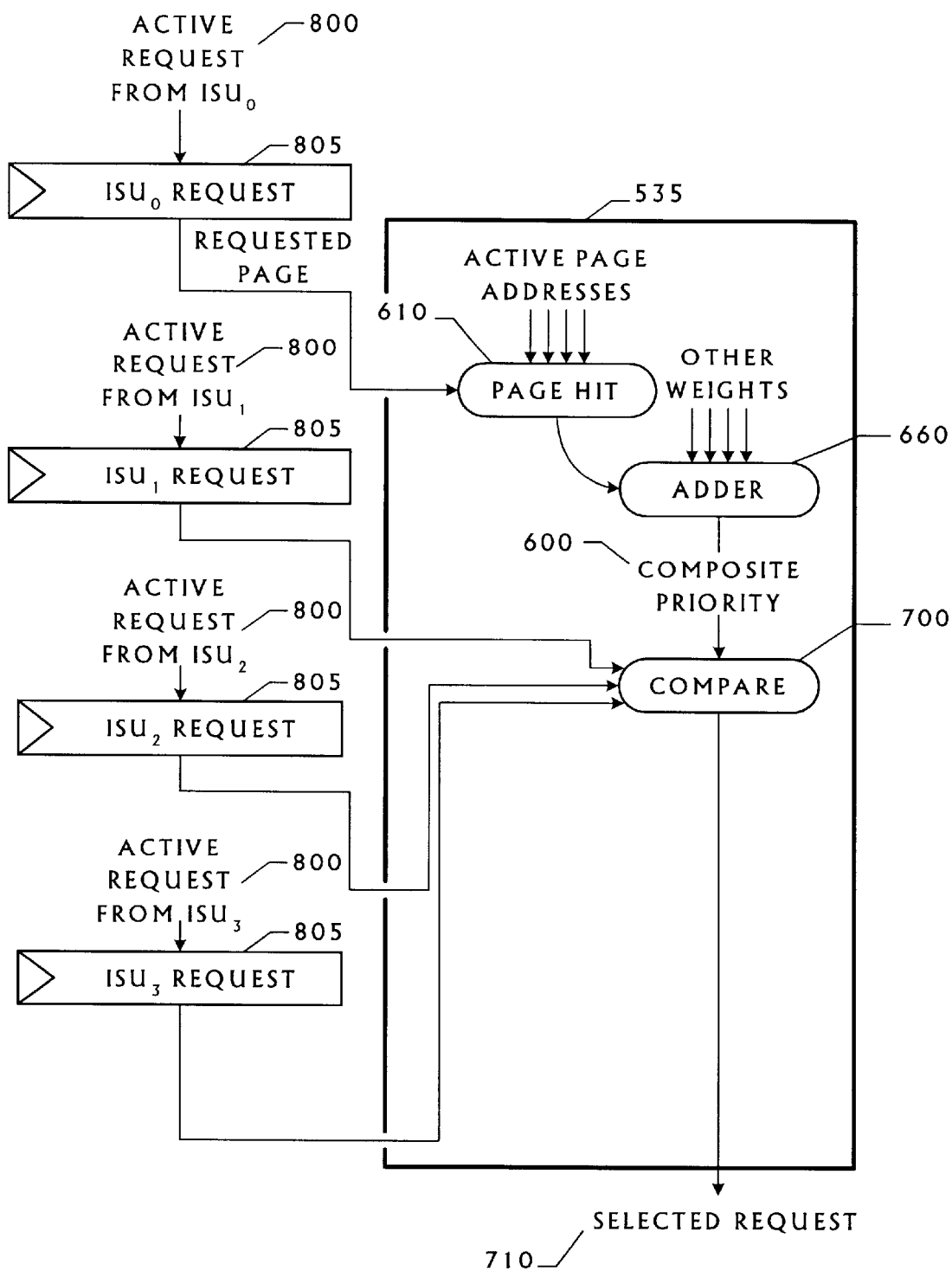

FIG. 7 illustrates the four composite priorities 660 being compared against each other by a comparator 700 to determine a highest priority request 710. In the event of a tie, the number of the ISU 500 is used to select the request. For example, if the request for the $ISU_2$ ties with the request for the $ISU_3$, the request for the $ISU_3$ will be selected because 3>2. The comparison is an arithmetic compare and is completed in less than one clock cycle. FIG. 8 illustrates the selection of one request 800 (in the illustrated instance, from the $ISU_0$) in a single clock cycle. Note that, in this particular embodiment, the active requests 800 are buffered in request registers 805. The request registers 805 are used to hold the signals from the ISUs 500 because of the relatively high frequency at which the logic is operating, i.e., 180 MHz. At higher frequencies, register are also used to re-synchronize signals. Otherwise, the varying delay of each signal would cause the signals to be out of sync with each other.

The composite priority 600 for each ISU 500 request is determined the composite priorities 600 for each active request 800 is determined as set forth above and shown in FIG. 6. The composite priorities 600 are then compared as discussed above and shown in FIG. 7. In FIG. 8, the active request 800 from the $ISU_O$ is a page hit 610 for which it receives an additional weight that is added to the "other weights" by the adder 660, to generate the composite request 660 considered by the comparator 700. As will be appreciated by those in the art having the benefit of this disclosure, not every cycle will have four active requests presented.

Thus, the MIU 510 selects one of the four valid packets to be processed based on a programmable priority mechanism. The selected packet is dispatched to the memory interface 430 (shown in FIG. 4). The MIU 510 also sends a FIFO read signal to the ISU 500 generating the selected request to indicate that the request has been dispatched and that the ISU should present another request if one is available. Table 4 shows the four FIFO read acknowledgement signals sent back to the ISUs 500

TABLE 4

Acknowledgements Output to Input Sorting Units

| Signal Name | Bits | Meaning |
| --- | --- | --- |
| MI_IS0_FIFOREAD | 1 | FIFO read signal to $ISU_0$ |
| MI_IS1_FIFOREAD | 1 | FIFO read signal to $ISU_1$ |
| MI_IS2_FIFOREAD | 1 | FIFO read signal to $ISU_2$ |
| MI_IS3_FIFOREAD | 1 | FIFO read signal to $ISU_3$ |

One particular application of the embodiment of FIGS. 4–8 is a crossbar switch. One such crossbar switch is disclosed and claimed in application Ser. No. 09/871,277 entitled "Self-Optimizing Crossbar Switch," filed on an even date herewith. This particular embodiment includes multiple MIUs 510, memory interfaces 430, memory controllers 432, and memories 440. Each MIU 510 is associated with a respective memory interface 430, memory controller 432, and memory 440. Each ISU 500 is hardwired to each MIU 510. Each device may therefore access any memory 440 through its respective ISU 500 and the memory 440's respective MIU 510. Note that, because multiple memories 440 may be returning data to the same devices, returned read data is multiplexed back to the devices. This application is commonly assigned herewith to Sun Microsystems, Inc. In this particular embodiment, the ASL 425, the memory interface 430, and the memory controller 432 are all on the same chip, or physical device. However, this is not necessary to the practice of the invention.

Some portions of the detailed descriptions herein are consequently presented in terms of a software implemented process involving symbolic representations of operations on data bits within a memory in a computing system or a computing device. For example, the embodiment illustrated in FIGS. 4–8 employs programmable registers. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for accessing a shared memory, said method comprising:
   receiving a plurality of access requests;
   presenting a plurality of characteristics for each access request;
   ascertaining a plurality of operational characteristics;
   assigning a weight factor to each characteristic of each of the access requests;
   assigning a weight factor to each operational characteristic;
   obtaining a composite request priority for each access request from the access request's respective assigned weight factors; and
   dynamically selecting one of the access requests for processing dependent upon said composite request priority for each access request.

2. The method of claim 1, wherein receiving a plurality of access requests includes storing each access request in a respective input sorting unit.

3. The method of claim 2, wherein storing each access request in the respective input sorting unit includes storing each access request in a respective FIFO queue.

4. The method of claim 2, wherein presenting the plurality of characteristics for each access request includes presenting at least one of whether the access request is a page miss, whether the access request is a bank miss, or a default priority.

5. The method of claim 2, wherein ascertaining the plurality of operational characteristics includes presenting at least one of whether the input sorting unit is nearly full, if the input sorting unit stores a read request, or whether a read buffer is full.

6. The method of claim 1, wherein presenting the plurality of characteristics for each access request includes presenting at least one of whether the access request is a page miss, whether the access request is a bank miss, or a default priority.

7. The method of claim 6, wherein ascertaining the plurality of operational characteristics includes presenting at least one of whether an input sorting unit is nearly full, if the input sorting unit stores a read request, or whether a read buffer is full.

8. The method of claim 1, wherein selecting one of the access requests further includes:
   comparing the composite request priorities of the access requests; and selecting one of the access requests predicated on the comparison.

9. The method of claim 8, wherein obtaining the composite request priority for each access request includes summing the assigned weight factors.

10. The method of claim 8, wherein selecting one of the access requests predicated on the comparison includes selecting the access request with the highest composite priority.

11. The method of claim 8, further comprising programming the values of the assigned weight factors before they are assigned.

12. The method of claim 8, further comprising increasing the composite request priority of each access request not selected or decreasing the composite request priority of the selected request.

13. The method of claim 1, further comprising increasing the priority of each access request not selected or decreasing the priority of the selected request.

14. The method of claim 1, further comprising generating the access requests.

15. The method of claim 1, further comprising acknowledging that the selected access request has been selected.

16. A method for accessing a shared memory, said method comprising:
   means for receiving a plurality of access requests;
   means for presenting a plurality of characteristics for each access request;
   means for ascertaining a plurality of operational characteristics;
   means for assigning a weight factor to each characteristic or the access requests;
   means for assigning a weight factor to each operational characteristic;
   means for obtaining a composite request priority for each access request from the access request's respective assigned weight factors; and
   means for dynamically selecting one of the access requests for processing dependent upon said composite request priority for each access request.

17. The method of claim 16, wherein the means for receiving a plurality of access requests includes means for storing each access request in a respective input sorting unit.

18. The method of claim 17, wherein the means for storing each access request in the respective input sorting unit includes means for storing each access request in a respective FIFO queue.

19. The method of claim 17, wherein the means for presenting the plurality of characteristics for each access request includes means for presenting at least one of whether the access request is a page miss, whether the access request is a bank miss, or a default priority.

20. The method of claim 17, wherein the means for ascertaining the plurality of operational characteristics includes means for presenting at least one of whether the input sorting unit is nearly full, if the input sorting unit stores a read request, or whether a read buffer is full.

21. The method of claim 16, wherein the means for presenting the plurality of characteristics for each access request includes means for presenting at least one of whether the access request is a page miss, whether the access request is a bank miss, or a default priority.

22. The method of claim 21, wherein the means for ascertaining the plurality of operational characteristics includes means for presenting at least one of whether an input sorting unit is nearly full, if the input sorting unit stores a read request, or whether a read buffer is full.

23. The method of claim 16, wherein the means for selecting one of the access requests includes:
   means for comparing the composite request priorities of the access requests; and
   means for selecting one of the access requests predicated on the comparison.

24. The method of claim 23, wherein the means for obtaining the composite request priority for each access request includes means for summing the assigned weight factors.

25. The method of claim 23, wherein the means for selecting one of the access requests predicated on the comparison includes means for selecting the access request with the highest composite priority.

26. The method of claim 23, further comprising means for programming the values of the assigned weight factors before they are assigned.

27. The method of claim 23, further comprising means for increasing the composite request priority of each access request not selected or decreasing the composite request priority of the selected request.

28. The method of claim 16, further comprising means for increasing the priority of each access request not selected or decreasing the priority of the selected request.

29. The method of claim 16, further comprising means for generating the access requests.

30. The method of claim 16, further comprising means for acknowledging that the selected access request has been selected.

31. An arbitration and select logic unit, comprising:
 a plurality of input sorting units, each input sorting unit configured to receive a respective access request;
 a merge and interleave unit configured to:
  receive a plurality of characteristics for each access request;
  receive a plurality of operational characteristics;
  assign a weight factor to each characteristic of each of the access requests;
  assign a weight factor to each operational characteristic;
  obtain a composite request priority for each access request from the access request's respective assigned weight factors; and
  dynamically select one of the access requests for processing dependent upon said composite request priority for each access request.

32. The arbitration and select logic of claim 31, wherein the plurality of input sorting units include a first-in, first-out queue for each input sorting unit.

33. The arbitration and select logic of claim 31, wherein the merge and interleave unit includes:
 a priority generator for each input sorting unit configured to:
  receive the characteristics for the respective access request received by the input sorting unit;
  receive the operational characteristics; and
  generate said composite request priority from the characteristics of the access requests and the operational characteristics;
 a priority compare circuit configured to:
  compare the composite request priorities generated by the priority generators; and
  select one access request predicated on the comparison of the composite request priorities; and
 a request multiplexer controlled by the priority compare circuit to output the selected access request.

34. The arbitration and select logic of claim 33, wherein the merge and interleave unit further includes:
 a plurality of programmable registers;
 a decode unit configured to receive the selected request from the request multiplexer to determine whether the selected request is a register operation and, if so, to send a plurality of control and data signals to the programmable registers; and
 an output multiplexer for combining register read data with request data for output.

35. The arbitration and select logic of claim 31, wherein the merge and interleave unit includes:
 a priority generator for each input sorting unit configured to:
  receive the characteristics for the access request received by the input sorting unit; and
  generate a partial composite request priority from the characteristics of the access requests; and
 a priority compare circuit configured to:
  receive the operational characteristics;
  generate a final composite request priority from the partial composite request priority and the operational characteristics;
  compare the final composite request priorities; and
  select one access request predicated on the comparison of the final composite request priorities; and
 a request multiplexer controlled by the priority compare circuit to output the selected access request.

36. The arbitration and select logic of claim 35, wherein the merge and interleave unit further includes:
 a plurality of programmable registers;
 a decode unit configured to receive the selected request from the request multiplexer to determine whether the selected request is a register operation and, if so, to send a plurality of control and data signals to the programmable registers; and
 an output multiplexer for combining register read data with request data for output.

37. A memory subsystem for an electronic computing device, comprising:
 an arbitration and select logic unit, comprising:
  a plurality of input sorting units, each configured to receive a respective access request from a plurality of devices via a bus system;
  a merge and interleave unit configured to:
   receive a plurality of characteristics for each access request;
   receive a plurality of operational characteristics;
   assign a weight factor to each characteristic of each of the access requests;
   assign a weight factor to each operational characteristic;
   obtain a composite request priority for each access request from the access request's respective assigned weight factors; and
   dynamically select one of the access requests for processing dependent upon said composite request priority for each access request;
 a memory interface configured to receive the selected access request from the arbitration and select logic unit;
 a memory controller configured to implement the selected access request received from the arbitration and select logic unit via the memory interface; and
 a shared memory configured to be accessed by the devices.

38. The memory subsystem of claim 37, wherein the plurality of devices includes a plurality of frame buffer controllers.

39. The memory subsystem of claim 37, wherein the plurality of input sorting units includes a first-in, first-out queue for each input sorting unit.

40. The memory subsystem of claim 37, wherein the merge and interleave unit includes:
 a priority generator for each input sorting unit configured to:

receive the characteristics for the access request received by the input sorting unit;

receive the operational characteristics; and generate a composite request priority from the characteristics of the access requests and the operational characteristics;

a priority compare circuit configured to:

compare the composite request priorities generated by the priority generators; and select one access request predicated on the comparison of the composite request priorities; and a request multiplexer controlled by the priority compare circuit to output the selected access request.

41. The memory subsystem of claim 40, wherein the merge and interleave unit further includes:

a plurality of programmable registers;

a decode unit configured to receive the selected request from the request multiplexer to determine whether the selected request is a register operation and, if so, to send a plurality of control and data signals to the programmable registers; and an output multiplexer for combining register read data with request data for output.

42. The memory subsystem of claim 37, wherein the memory interface is a 200M Triangle Graphics memory interface.

43. The memory subsystem of claim 37, wherein the shared memory is an interleaved memory.

44. A computing device, comprising:

a plurality of devices, each capable of generating an access request;

a bus system;

a memory subsystem including:

an arbitration and select logic unit, comprising:

a plurality of input sorting units, each configured to receive a respective access request from the devices over the bus system;

a merge and interleave unit configured to:

receive a plurality of characteristics for each access request;

receive a plurality of operational characteristics;

assign a weight factor to each characteristic of each of the access requests;

assign a weight factor to each operational characteristic;

obtain a composite request priority for each access request from the access request's respective assigned weight factors; and dynamically select one of the access requests for processing dependent upon said composite request priority for each access request;

a memory interface configured to receive the selected access request from the arbitration and select logic unit;

a memory controller configured to implement the selected access request received from the arbitration and select logic unit via the memory interface; and a shared memory configured to be accessed by the devices.

45. The computing device of claim 44, wherein the plurality of devices includes a plurality of frame buffer controllers.

46. The computing device of claim 44, wherein the plurality of input sorting units includes a first-in, first-out queue for each input sorting unit.

47. The computing device of claim 44, wherein the merge and interleave unit includes:

a priority generator for each input sorting unit configured to:

receive the characteristics for the access request received by the input sorting unit;

receive the operational characteristics; and generate a composite request priority from the characteristics of the access requests and the operational characteristics;

a priority compare circuit configured to:

compare the composite request priorities generated by the priority generators; and select one access request predicated on the comparison of the composite request priorities; and a request multiplexer controlled by the priority compare circuit to output the selected access request.

48. The computing device of claim 47, wherein the merge and interleave unit further includes:

a plurality of programmable registers;

a decode unit configured to receive the selected request from the request multiplexer to determine whether the selected request is a register operation and, if so, to send a plurality of control and data signals to the programmable registers; and an output multiplexer for combining register read data with request data for output.

49. The computing device of claim 44, wherein the memory interface is a 200M Triangle Graphics memory interface.

50. The computing device of claim 44, wherein the shared memory is an interleaved memory.

* * * * *